US008478662B1

(12) United States Patent
Snodgrass et al.

(10) Patent No.: US 8,478,662 B1
(45) Date of Patent: Jul. 2, 2013

(54) CUSTOMIZED ELECTRONIC BOOKS WITH SUPPLEMENTAL CONTENT

(75) Inventors: Ryan J. Snodgrass, Kirkland, WA (US); Tom Killalea, Seattle, WA (US); Luis Felipe Cabrera, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 120 days.

(21) Appl. No.: 12/954,476

(22) Filed: Nov. 24, 2010

(51) Int. Cl.
*G06Q 30/00* (2012.01)
*G06Q 30/02* (2012.01)

(52) U.S. Cl.
CPC .................................. *G06Q 30/02* (2013.01)
USPC .......................................... 705/26.7; 705/26.1

(58) Field of Classification Search
USPC ................................................. 705/26.1, 26.7
See application file for complete search history.

(56) References Cited

U.S. PATENT DOCUMENTS

| 6,463,585 | B1 * | 10/2002 | Hendricks et al. | 725/35 |
| 7,305,436 | B2 * | 12/2007 | Willis | 709/204 |
| 8,051,074 | B2 * | 11/2011 | Eom et al. | 707/722 |
| 8,150,842 | B2 * | 4/2012 | Brougher et al. | 707/723 |
| 2002/0049738 | A1 * | 4/2002 | Epstein | 707/1 |
| 2002/0107759 | A1 * | 8/2002 | An | 705/26 |
| 2004/0111467 | A1 * | 6/2004 | Willis | 709/203 |
| 2009/0024489 | A1 * | 1/2009 | Baldua et al. | 705/27 |
| 2009/0070376 | A1 * | 3/2009 | Eom et al. | 707/104.1 |
| 2009/0132341 | A1 * | 5/2009 | Klinger et al. | 705/10 |
| 2009/0157667 | A1 * | 6/2009 | Brougher et al. | 707/5 |
| 2009/0216623 | A1 * | 8/2009 | Hendricks et al. | 705/10 |

OTHER PUBLICATIONS

Unknown author, "Siebel Systems Launches Online Community; New Forum Provides Open Discussion, Relationship for Building World's Largest and Most Experienced CRM Customer Base," Business Wire, New York, Oct. 18, 2005.*

* cited by examiner

*Primary Examiner* — Amee A Shah
(74) *Attorney, Agent, or Firm* — Lee & Hayes, PLLC

(57) ABSTRACT

Architectures and techniques are described to provide customized versions of electronic books with various supplemental content items. The electronic books include a framework having core content that is provided with each electronic book and supplemental content portions that are populated with supplemental content items based on the preferences of particular readers of the electronic books. In some cases, the electronic books may include supplemental content options that are selectable to provide access to supplemental content items by readers of the electronic books. The supplemental content items accessible via the supplement content options may also depend on the preferences of the readers.

27 Claims, 10 Drawing Sheets

US 8,478,662 B1

CUSTOMIZED ELECTRONIC BOOKS WITH SUPPLEMENTAL CONTENT

BACKGROUND

Individuals often enjoy content by reading printed or electronic media. In many cases, people choose content to read based on the source of the content. For example, an individual may choose to read content provided by authors and/or publishers having interests or views similar to those of the individual. In other cases, individuals may select content to read based on recommendations from friends, experts, or others having similar tastes. However, since the content of media items is usually fixed, it can be difficult to tailor the content of the media item to fit the preferences of an individual.

Additionally, content providers are looking for ways to enhance an individual's experience when reading a media item. Supplemental content, such as illustrations, annotations, and so on, may add richness to a media item and supplemental content produced by contributors having similar interests and/or that is recommended by those trusted by an individual is more likely to be consumed by the individual. Unfortunately, accessibility to supplemental content that may be of interest to an individual is often limited and retrieving relevant supplemental content may be time consuming and inconvenient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
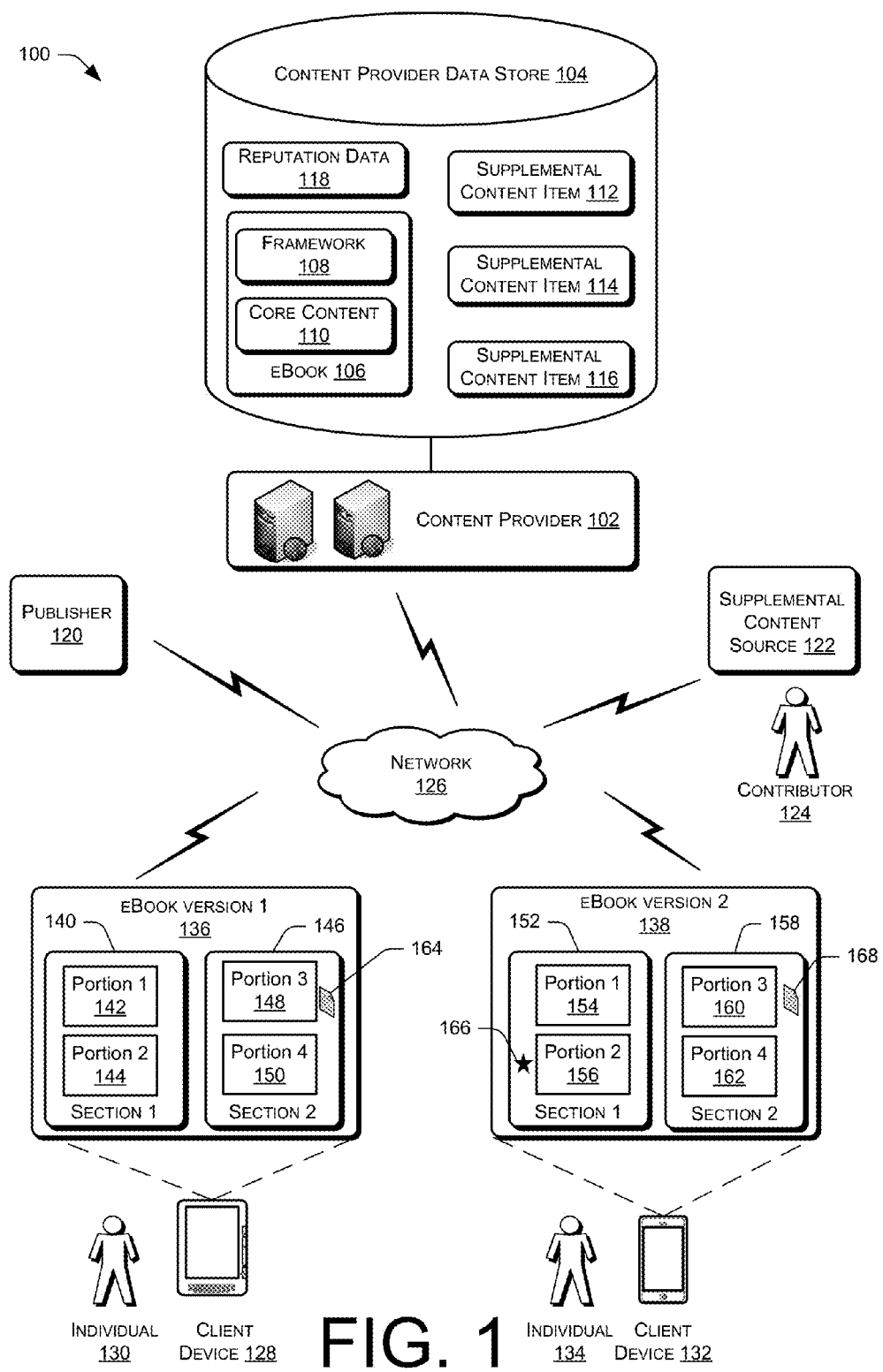
FIG. 1 illustrates an architecture for providing electronic books to individuals with supplemental content that is tailored to the preferences of the individuals. The architecture includes a content provider coupled to serve one or more client devices.

This disclosure describes architectures and techniques to customize electronic books with supplemental content, where that customization is based on preferences of individuals. In particular, a content provider may obtain electronic books from publishers, where the electronic books have a framework. For example, each page or section of the electronic books may be divided into one or more portions, where each portion includes core content, supplemental content, or a combination thereof. The core content portions may include core content that is provided to all individuals consuming the electronic book. In addition, the supplemental content portions may include various supplemental content items that populate the supplemental content portions depending on the preferences of a particular individual. In this way, different versions of an electronic book may be produced for different individuals because each version of the electronic book can contain different supplemental content according to the preferences of each individual. For example, different individuals may receive versions of an electronic book having pictures of different images and/or illustrations produced by different illustrators. In another example, different text supplemental content items may reflect a certain writing style (e.g. science fiction, romantic, etc.) or include different content based on preferences of the individuals.

In some cases, the core content may be enhanced by supplemental content. In these situations, a supplemental content option may be provided in association with a certain portion of the core content. The supplemental content option may provide individuals with a choice regarding whether or not to access one or more supplemental content items related to a particular portion of the core content. The supplemental content items offered to the individuals via the supplemental content option may depend on preferences of the respective individuals. In a particular example, a supplemental content option may provide an individual access to alternative storylines, reference materials, annotations, and so on. In this way, content providers can enhance a reading experience of an individual by providing supplemental content that the individual may find interesting or helpful.

The supplemental content items provided with electronic books may be related to a reputation of a contributor of a supplemental content item with respect to a particular individual. The reputation of a contributor with respect to an individual may depend on whether or not the contributor is an expert or is someone associated with an expert in a field related to the electronic book. In addition, the reputation of the contributor with respect to the individual may be based on whether the contributor is a member of a social network of the individual and/or whether the supplemental content item has received favorable reviews from members of the individual's social network. Consequently, a content provider can provide electronic books with supplemental content items that are more likely to be enjoyed by the individual.

Some implementations of the architecture and techniques described herein are described in the context of electronic books. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listens to, or otherwise experience.

FIG. 1 illustrates an architecture 100 that facilitates distribution of electronic books (eBooks) to individuals. In particular, the architecture 100 has a content provider 102 that provides versions of an eBook with different supplemental content items, where the supplemental content items provided to a particular individual are based on preferences of the particular individual.

The content provider 102 is coupled to a content provider data store 104. The content provider data store 104 stores one or more electronic books, such as the electronic book 106. The content provider 102 is configured to distribute the one or more eBooks of the content provider data store 104 to a number of client devices.

The electronic book 106 includes a framework 108 and core content 110. The framework 108 may provide a structure for the electronic book 106, such that each page or section of the electronic book 106 may include part of the core content 110 rendered in one or more core content portions and supplemental content rendered in one or more supplemental content portions.

In some cases, the framework 108 may provide a very specific structure that specifies particular content to include in each core content portion and each supplemental content portion. For example, when the electronic book 106 is a novel, the number of supplemental content portions may be very limited. In other situations, the framework 108 may provide a loose structure for the electronic book 106. To illustrate, the framework 108 may include many supplemental content portions, such that a large amount of supplemental content is included in the electronic book 106. In an illustrative implementation, the framework 108 may specify a theme for each chapter or each section of the electronic book 106 and contributors may provide one or more supplemental content items, such as paragraphs or several pages of a section, to include in the respective supplemental content portions of the electronic book 106.

The content provider data store 104 also stores a number of supplemental content items 112-116 to provide in association with electronic books. The supplemental content items 112-116 may include video content, text content, image content, audio content, or a combination thereof. For example, the supplemental content items 112-116 may include video related to content of a particular portion of the electronic book 106, such as a how-to video in a home remodeling magazine, a tour of an historical site in a travel book, a scene of a novel or play acted out by drama students or a local acting group, animation of a scene in a novel or play, and so on. In another example, the supplemental content items 112-116 may include image content, such as illustrations, photos, etc. Further, the supplemental content items 112-116 may include text content, such as alternate endings, alternate storylines, annotations, reference materials, and the like. The supplemental content items 112-116 may also include audio content, such as a voice recording of text content, an audio explanation or lecture related to a concept in a textbook, and so on.

The content provider data store 104 also stores reputation data 118, which may include information relating to individuals accessing electronic books and supplemental content items, information relating to contributors of supplemental content items, or both. For example, the reputation data 118 may include profile information of certain individuals and/or contributors, such as age, location of residence, profession, length of time in profession, educational background, and the like. The reputation data 118 may also include interests of the individuals and/or contributors, such as hobbies, membership in organizations, activities, and so on, and preferences of the individuals and/or contributors, such as favorites for genres of movies and/or books, favorites for authors, actors, and/or illustrators, parental control settings (e.g. ratings related to suitability of content for audiences of particular ages), and so forth. In addition, the reputation data 118 may include information about social networks of individuals and/or contributors. The social network information included in the reputation data 118 may include lists of friends or contacts for the individuals/contributors with respect to one or more social networking sites, lists of followers of the individuals/contributors with respect to one or more micro-blogging sites, lists of people that the individuals/contributors follow via micro-blogging sites, second degree followers of the individuals/contributors, friends of friends of the individuals/contributors, a rate of increase of contacts and/or followers of the individuals/contributors, and the like.

The reputation data 118 may also include history of electronic books retrieved from the content provider 102 by the individuals, reading data indicating a reading history of the electronic books retrieved by the individuals, history of supplemental content items consumed by the individuals (e.g. previous consumption of supplemental content items produced by particular contributors), history of supplemental content items consumed by members of the social networks of the individuals, and the like. Further, the reputation data 118 may include ratings of supplemental content items produced by respective contributors (e.g. ratings provided by experts or members of an individual's social network), expert status of contributors, recommendations of supplemental content items produced by contributors (e.g. recommendations from experts or members of an individual's social network), or combinations thereof.

The content provider 102 may utilize the reputation data 118 to determine a reputation of the contributor with respect to a particular individual. In some cases, the content provider 102 may determine a reputation of the contributor with respect to the individual to determine whether to provide supplemental content items produced by the contributor to the individual. For example, the content provider 102 may identify supplemental content items related to the electronic book 106. The content provider 102 may then evaluate information of the contributors of the supplemental content items with respect to information about the individual to determine a reputation of the contributor with respect to the individual.

The reputation of the contributor with respect to the individual may be greater when the contributor is within a social network of the individual or the contributor is an expert in a field related to the electronic book 106. The reputation of the contributor with respect to the individual may also be greater when the contributor and individual share similar interests and views and/or have similar profile information. By determining a reputation of the contributor with respect to the individual, the content provider 102 can determine whether supplemental content items produced by the contributor would be relevant to the individual. When the content provider 102 determines that the supplemental content items produced by the contributor are relevant to the individual, the content provider 102 may provide one or more supplemental content items produced by the contributor in association with the electronic book 106 to the individual.

In an illustrative example, an individual may obtain the electronic book 106 from the content provider 102. The electronic book 106 may be a Greece travel book. In addition, the content provider 102 may have obtained supplemental content items from members of the social network of the individual related to Greece. To illustrate, the content provider 102 may have obtained annotations by the Ancient Greek history professor of the individual with respect to portions of electronic book 106. Additionally, the content provider 102 may have obtained photos taken by a friend of the individual during a recent trip to Greece. Thus, since the reputation of the individual's professor and friend are higher with respect to the individual than other contributors, the annotations of the individual's professor and the photos of the individual's friend may be supplemental content items provided to the individual with the electronic book 106.

The content provider 102 may receive electronic books from a publisher 120 and supplemental content items from one or more supplemental content sources represented by the supplemental content source 122. The supplemental content source 122 may represent a group, a business entity, and/or an individual. Members of the supplemental content source 122 that produce supplemental content items are referred to herein as "contributors" such as the representative contributor 124. In some cases, the publisher 120 may also provide supplemental content items related to the electronic book 106.

The content provider 102 may communicate with the publisher 120 and the supplemental content source 122 via the network 126. The network 126 may be representative of any one or combination of multiple different types of wired and wireless networks, such as the Internet, cable networks, satellite networks, wide area wireless communication networks, wireless local area networks, and public switched telephone networks (PSTN).

Additionally, the content provider 102 may communicate with a first client device 128 associated with a first individual 130 and a second client device 132 associated with a second individual 134 via the network 126. Although the client device 128 is shown as an electronic book reader device and the client device 132 is shown as a smart phone, the client devices 128 and 132 may also include a desktop computer, a laptop computer, a tablet computer, a portable navigation system, a personal digital assistant (PDA), a portable media player, an entertainment device, a netbook, a gaming console, mobile handsets, a DVD player, a media center, a household appliance, and the like.

The content provider 102 may provide a first version of the electronic book 136 to the first client device 128 and a second version of the electronic book 138 to the second client device 132. The first version of the electronic book 136 and the second version of the electronic book 138 may differ because different supplemental content items may be provided in association with each respective version of the electronic book 106. In some cases, different supplemental content items may be provided in association with the first and second versions of the electronic book 136, 138 due to differing reputations of the contributors of the supplemental content items with respect to the first and second individuals 130 and 134. For example, the first individual 130 and the second individual 134 may have differing social networks, preferences, profile information, etc. Thus, the contributors of supplemental content items may have different reputations with respect to the first individual 130 and the second individual 134. Consequently, the supplemental content items provided with the first version of the electronic book 136 and the second version of the electronic book 138 are different.

In an illustrative implementation, the first version of the electronic book 136 includes a first section 140 having a first portion 142 and a second portion 144 and a second section 146 having a third portion 148 and a fourth portion 150. The first section 140 and the second section 146 may represent pages of an electronic book, articles of an electronic book, chapters of an electronic book, another combination of elements of an electronic book, and so on. In addition, the portions 142-144 and 148-150 may include words, images, video, sentences, paragraphs, etc. of the respective sections 140 and 146. In some cases, the portions 142-144 and 148-150 may represent components of the framework 108. For example, one or more of the portions 142-144 and 148-150 may be rendered in association with the core content 110. Additionally, one or more of the portions 142-144 and 148-150 may be rendered in association with supplemental content items, such as the supplemental content items 112-116. Referring back to the previous example concerning the Greece travel book, the framework 108 may specify that the portions 142, 144, and 148 include core content corresponding to Athens, Greece provided by the publisher 120, while the portion 150 is dedicated to images of Athens. Thus, the portion 150 may include one or more of the photos taken by the friend of the individual 130 who recently travelled to Greece.

Further, the second version of the electronic book 138 includes a first section 152 having a first portion 154 and a second portion 156 and a second section 158 having a third portion 160 and a fourth portion 162. As with the sections 140 and 146 of the first version of the electronic book 136, the portions 154-156 and 160-162 may represent components of the framework 108. For example, one or more of the portions 154-156 and 160-162 may be associated with the core content 110. Additionally, one or more of the portions 154-156 and 160-162 may be associated with supplemental content items.

In a particular implementation, the portions 142-144 and 148 of the first version of the electronic book 128 and the portions 154-156 and 160 of the second version of the electronic book 134 may be associated with parts of the core content 110, while the portions 150 and 162 are associated with supplemental content items. The supplemental content items associated with the portions 150 and 162 may be different based on the reputations of respective contributors of the supplemental content items with respect to the individuals 130 and 134. For example, the supplemental content item 112 may be rendered in association with the portion 150 of the first version of the electronic book 136 because a reputation of the contributor of the supplemental content item 112 with respect to the individual 130 is greater than a threshold. The threshold may be based on a degree of familiarity between the individual 130 and the contributors of supplemental content items, preferences of the individual 130, whether or not the contributors are experts, etc. Again referring to the Greece travel book example, the friend of the individual 130 that recently travelled to Greece has a higher degree of familiarity with the individual 130 than other contributors of supplemental content items. Consequently, the photos taken by the friend of the individual 130 are included in the portion 150 rather than photos from other contributors. In another example, the supplemental content item 112 may be rendered in association with the portion 150 because the reputation of the contributor of the supplemental content item 112 with respect to the individual 130 is greater than the reputation of other contributors of supplemental content items with respect to the individual 130 even though the reputation of the contributor is not necessarily above a specified threshold.

However, the reputation of the contributor of the supplemental content item 112 with respect to the individual 134 may be less than the threshold or less than the reputations of other contributors of supplemental content items with respect to the individual 134. Thus, the supplemental content item 114 may be rendered in association with the portion 162 of the second version of the electronic book 138 because the reputation of the contributor of the supplemental content item 114 with respect to the individual 134 is greater than the threshold and/or greater than the reputation of other supplemental item contributors with respect to the individual 134. In a particular illustration, photos from an expert Greek photographer may be provided with respect to the portion 162 rather than the photos taken by the friend of the individual 130.

The first version of the electronic book 136 and the second version of the electronic book 138 may also include supplemental content options 164, 166, and 168. The supplemental content options 164-168 may provide access to supplemental content items. To illustrate, when the individual 130 selects the supplemental content option 164, the individual 130 may view supplemental content items related to the third portion 148, such as an image, reference materials, annotations, etc. Additionally, when the individual 134 selects the supplemental content option 166, the individual 134 may view supplemental content items related to the second portion 156 and the supplemental content option 168 may be selectable to view supplemental content items related to the third portion 160. The supplemental content items accessible by the individuals 130 and 134 via selection of the supplemental content options 164-168 may depend on the reputation of the contributors of the respective supplemental content items with respect to the individuals 130 and 134. In reference to the Greece travel book scenario previously presented, the supplemental content option 164 may be selectable to view the annotations by the Ancient Greek history professor of the individual 130 relating to the third portion 148. Since the individual 134 is not associated with the Ancient Greek history professor of the individual 130, the supplemental content option 168 may be selectable to view commentary from a travel expert relating to the third portion 160.

In some cases, the form of the supplemental content options 164-168 may represent different means of accessing supplemental content. For example, the supplemental content options 164 and 168, which are shaped like a document, may indicate that annotations, reference materials, and/or alternative text is available for the third portion 148 and the third portion 160. Further, the supplemental content option 166, which is shaped like a star, may indicate that supplemental video and/or image content is available with respect to the second portion 156.

By providing electronic books with supplemental content items, the reading experience of an individual may be enhanced. In addition, by providing different versions of electronic books with different supplemental content items based on the reputation of contributors with respect to individuals, a content provider can provide supplemental content items to the individuals that are relevant to the individuals and that the individuals are more likely to consume.

Figure 2:
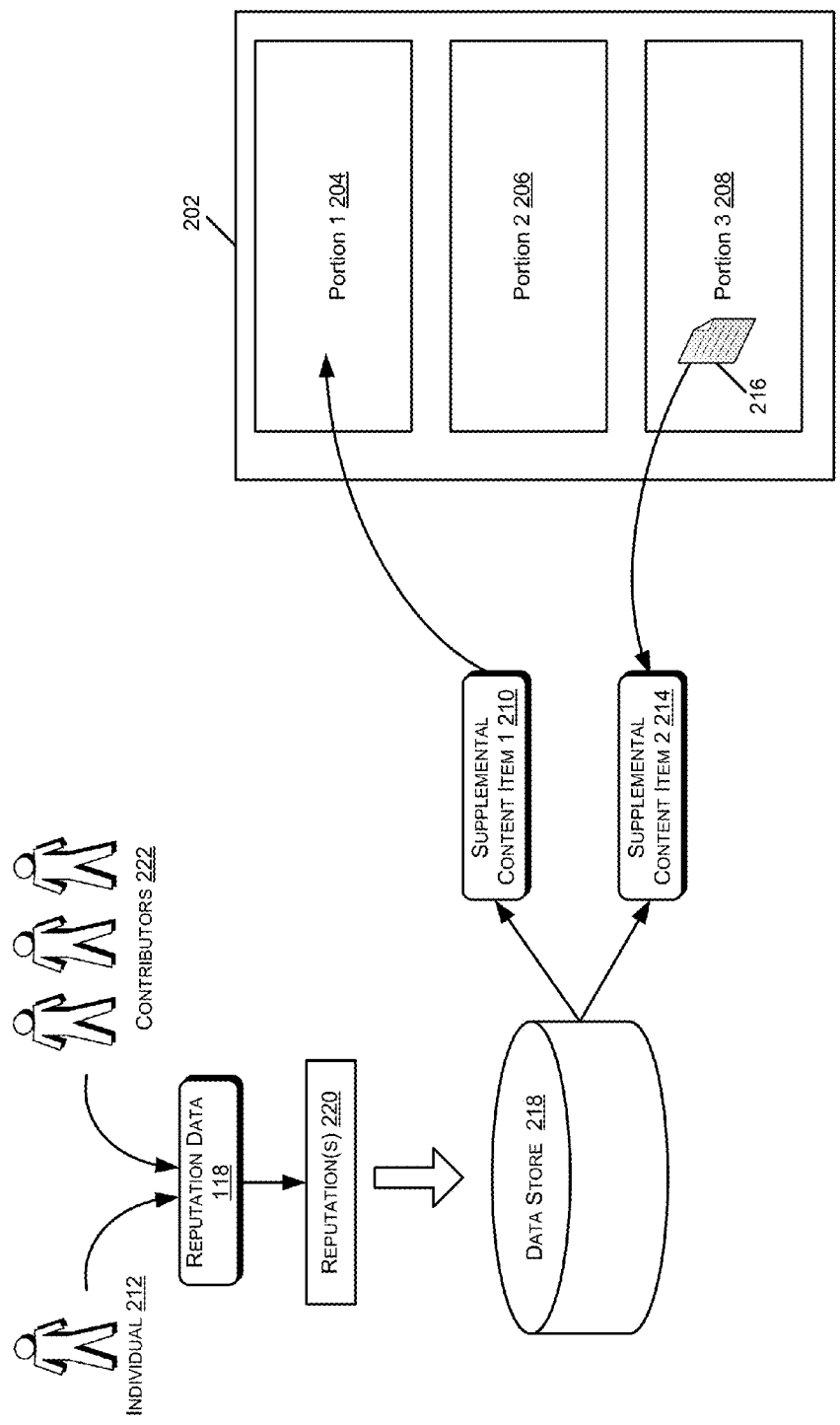
FIG. 2 illustrates providing supplemental content in association with portions of an electronic book.

FIG. 2 illustrates providing supplemental content in association with portions of an electronic book. FIG. 2 shows a section of an electronic book 202, such as a page of an electronic book, a paragraph of the electronic book, an article of the electronic book, and the like. The section of the electronic book 202 includes a first portion 204, a second portion 206, and a third portion 208. The portions 204-208 may include text content, video content, audio content, image content, or combinations thereof. In one example, the portions 206 and 208 may include text sentences and/or paragraphs and the portion 204 may include images, video and/or audio related to the text of the portions 206, 208.

In the illustrative example shown in FIG. 2, the first portion 204 is associated with a first supplemental content item 210. That is, the first supplemental content item 210 is rendered in association with the first portion 204. For example, when an individual, such as individual 212, is viewing the portion of the electronic book 202, the first supplemental content item 210 is rendered in the location of the section 202 designated as the first portion 204.

Additionally, the third portion 208 is associated with a second supplemental content item 214. To illustrate, the second supplemental content item 214 may include text content, image content, video content, audio content, or a combination thereof, related to the content of the third portion 208.

The second supplemental content item 214 may be accessible via a supplemental content option 216. In some cases, upon selection of the supplemental content option 216, the second supplemental content item 214 is rendered in association with the third portion 208, such as in a pop-up window or in another portion of a display that includes the section 202. In other cases, selection of the supplemental content option 216 may cause the display of the second supplemental content item 214 in a window that replaces the section 202. In still other situations, selection of the supplemental content option 216 may cause the display of a pop-up window with a brief description of the second supplemental content item 214 and with a link that is selectable to access the second supplemental content item 214.

The supplemental content items 210, 214 may be stored in a data store 218 with a number of other supplemental content items, such as the content provider data store 104 of FIG. 1. The supplemental content items 210, 214 may be associated with the portions 204 and 208, respectively, of the electronic book due to the reputations of the contributors of the supplemental content items 210, 214 with respect to the individual 212. In an illustrative implementation, reputation data 118 may be utilized to determine reputations 220 between the individual 212 and contributors of supplemental content items 222. In some instances, the reputations 220 may be ranked and/or compared to a threshold. The threshold may indicate a level of familiarity between a particular contributor 222 and the individual 212, a correspondence between characteristics of a particular contributor 222 with preferences of the individual 212, characteristics of supplemental content items provided by the contributors 222 with respect to preferences of the individual 212, or a combination thereof. The supplemental content items provided by the contributors 222 with the highest reputation with respect to the individual 212 may be provided in association with the portions 204 and 208. Thus, the reading experience of the individual 212 may be enhanced by utilizing the reputation data 118 to provide supplemental content in association with the section 202 that is more likely to be relevant to the individual 212 and more likely to be enjoyed by the individual 212.

Content Provider Architecture

Figure 3:
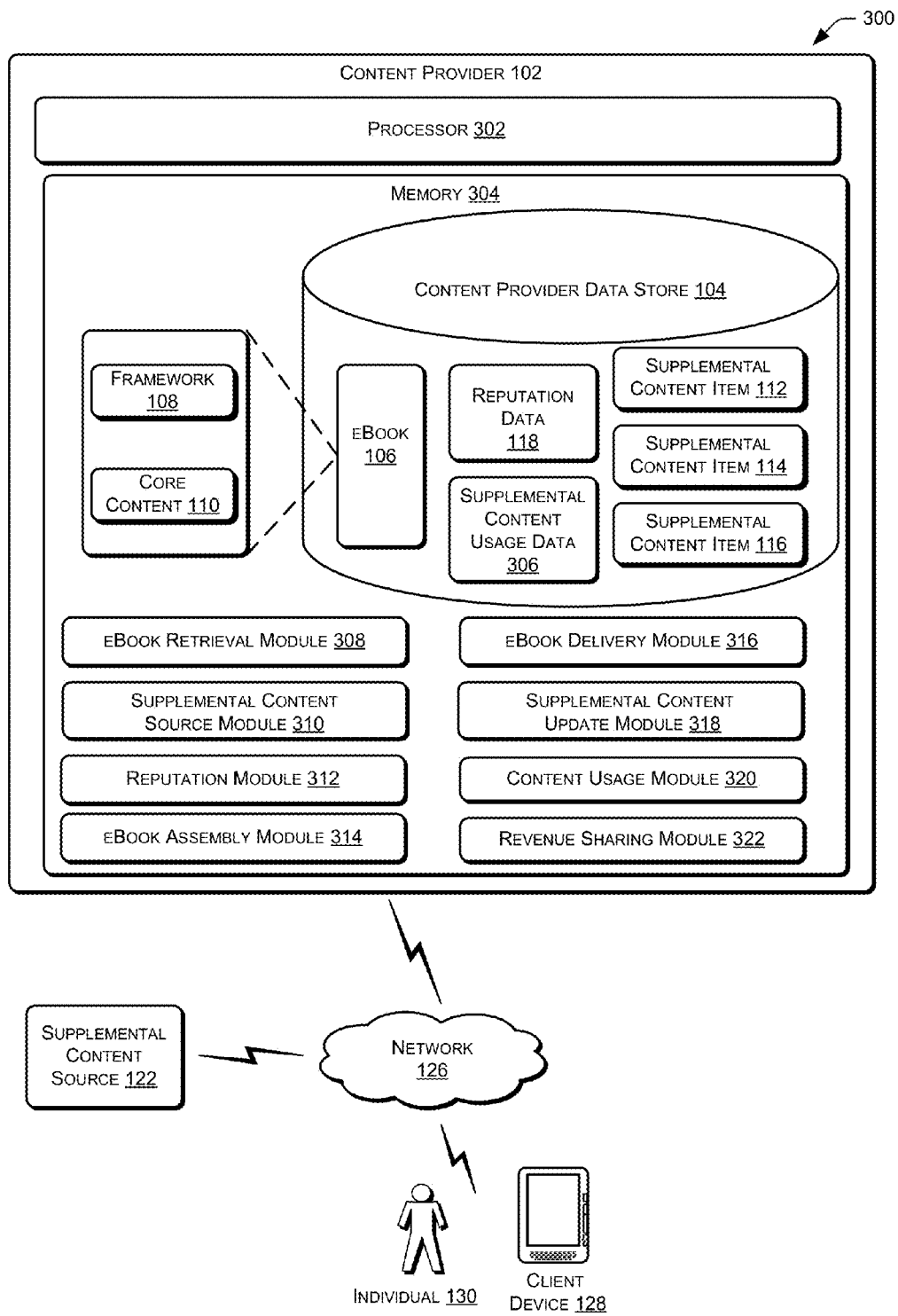
FIG. 3 shows components of the content provider from the architecture of FIG. 1.

FIG. 3 shows a system 300 that may include components of the content provider 102 from the architecture of FIG. 1. The content provider 102 may comprise a single server, a cluster of servers, a server farm or data center, and so forth, although other server architectures (e.g., a mainframe architecture) may also be used. In the example illustrated in FIG. 3, the content provider 102 may be part of an online retailer that offers electronic books for purchase.

The content provider 102 includes one or more processors indicated by the processor 302. The content provider 102 also includes memory 304 that is accessible by the processor 302. The memory 304 is an example of computer readable storage media and may include volatile memory, nonvolatile memory, removable memory, non-removable memory, or a combination thereof. For example, the memory 304 may include, but is not limited to, RAM, ROM, EEPROM, flash memory, one or more hard disks, solid state drives, optical memory (e.g. CD, DVD), or other non-transient memory technologies. The memory 304 may store a number of modules including computer-readable instructions executable by the processor 302 to produce customized versions of electronic books by providing supplemental content items that are relevant to the users with the electronic books.

The memory 304 includes the content provider data store 104. The content provider data store 104 may store one or more electronic books, such as the electronic book 106. The electronic book 106 includes a framework 108 and core content 110. The framework 108 may provide a structure for the electronic book 106 that includes core content portions and supplemental content portions. In some cases, the framework 108 may provide a very specific structure that specifies particular content to include in each core content portion and each supplemental content portion. In other cases, the framework 108 may be general in that the framework 108 specifies a theme or mood for one or more portions of the electronic book 106.

The content data store 104 also stores a number of supplemental content items 112-116 to provide in association with electronic books. The supplemental content items 112-116 may include video content, text content, image content, audio content, or a combination thereof. For example, the supplemental content items 112-116 may include content related to one or more portions of the electronic book 106.

The content provider data store 104 also stores reputation data 118. The reputation data 118 may include information relating to individuals accessing electronic books and supplemental content items, information relating to contributors of supplemental content items, or both. For example, the reputation data 118 may include profile information of individuals, interests of the individuals, preferences of the individuals, members of social networks of the individuals, and so forth. The reputation data 118 may also include history of electronic books retrieved from the content provider 102 by the individuals, reading data indicating a reading history of the electronic books retrieved, history of supplemental content items consumed by the individuals, ratings of supplemental content item contributors, profile information of contributors, expert status of contributors, individuals within a social network of the contributor, or combinations thereof. The social networks of the individuals may be identified through one or more contacts lists of the individuals, such as contacts lists related to email applications, social networking sites, micro-blogging sites, and the like.

The content provider data store 104 also stores supplemental content usage data 306. The supplemental content usage data 306 may include information relating to consumption of supplemental content items via client devices serviced by the content provider 102. For example, the supplemental content usage data 306 may indicate contributors of the supplemental content items consumed via the client devices, a number of times that particular supplemental content items have been consumed, indicators of progress of users of the client devices with respect to electronic books consumed via the client devices, or combinations thereof. The supplemental content usage data 306 may, upon request or periodically, be retrieved from client devices to be used to determine compensation to distribute to contributors of supplemental content items.

The memory 304 also stores an electronic book retrieval module 308 that is executable by the processor 302 to retrieve electronic books, such as the electronic book 106, from one or more publishers, such as the publisher 120 of FIG. 1. The electronic books may be associated with a framework that includes core content portions and a plurality of supplemental content portions. The supplemental content portions may indicate portions of the electronic books that may be rendered in association with supplemental content items.

In addition, the memory 304 stores a supplemental content source module 310 that is executable by the processor 302 to obtain supplemental content items from one or more supplemental content sources, such as the supplemental content source 122. In some cases, the supplemental content source 122 may send supplemental content items to the content provider 102 and indicate that the supplemental content items are associated with one or more respective electronic books. In other situations, the supplemental content source module 310 may send a request for supplemental content items to the supplemental content source 122. The supplemental content source module 310 may request the supplemental content items from the supplemental content source 122 based on a search for supplemental content items associated with particular electronic books. Further, the supplemental content source module 310 may obtain supplemental content items from a publisher of electronic books. In an illustrative implementation, the supplemental content source module 310 may obtain the supplemental content items 112-116 in relation to the electronic book 106.

The memory 304 stores a reputation module 312 that is executable by the processor 302 to determine a reputation of a contributor of a supplemental content item with respect to the individual 130. The reputation module 312 may access the reputation data 118 to determine the reputation of the contributor of a supplemental content item with respect to the individual 130. In an illustrative implementation, the reputation module 312 may determine interests and/or preferences of the individual 130 based on previously purchased electronic books, previously viewed supplemental content items, a user profile, and so on. Additionally, the reputation module 312 may determine whether the individual 130 prefers supplemental content produced by experts, whether the individual 130 desires to view supplemental content items based on rankings given by members of the social network of the individual, and the like. In this way, the reputation module 312 may determine a reputation of contributors of supplemental content items with respect to the individual 130.

Further, the memory 304 stores an electronic book assembly module 314 that is executable by the processor 302 to assign supplemental content items to supplemental content portions of an electronic book. For example, in response to receiving a request from the client device 128 submitted by the individual 130 for the electronic book 106, the electronic book assembly module 314 may identify a set of supplemental content items that are associated with the electronic book 106. In some cases, metadata of the supplemental content items may indicate that the supplemental content items are associated with the electronic book 106. In other cases, the content provider 102 may designate that supplemental content items are associated with the electronic book 102 because the subject matter of the supplemental content items is relevant to the subject matter of particular portions of the electronic book.

After identifying a set of supplemental content items associated with the electronic book 106, the electronic book assembly module 314 may determine particular supplemental content items from the set to associate with corresponding portions of the electronic book 106 when the electronic book 106 is provided to different individuals. In particular, the electronic book assembly module 314 may utilize the reputations of contributors of supplemental content items with respect to the individuals to determine that different supplemental content items may be provided in association with the electronic book 106 to the different individuals.

The electronic book assembly module 314 may also assign certain supplemental content items to corresponding supplemental content portions of the electronic book 106 based on the content of the supplemental content portions. For example, some supplemental content items may include content related to particular content of the electronic book 106. To illustrate, the electronic book assembly module 314 may assign a supplemental content item including video content of a tour of the Statue of Liberty to a portion of an electronic book that includes a history of the Statue of Liberty.

In some cases, the supplemental content items assigned to a particular supplemental content portion may depend on a subscription of the individual 130. In particular, supplemental content items having a higher resolution may be assigned to a particular supplemental content portion when the individual 130 is associated with a certain level of subscription. In other instances, supplemental content items having premium content produced by an expert may be assigned to supplemental content portions based on a subscription of the individual 130.

Further, the electronic book assembly module 314 may associate a supplemental content option with certain supplemental content items. In particular, the electronic book assembly module 314 may identify supplemental content items that include content related to particular content of the electronic book 106. For example, the electronic book assembly module 314 may identify annotations corresponding to certain portions of the electronic book 106 (e.g. certain pages, paragraphs, chapters, articles, etc.), video content related to specific portions of the electronic book 106, and so on. Continuing with this example, the electronic book assembly module 314 may specify that one or more supplemental content options are associated with the portions of the electronic book 106 relating to the annotations and that one or more supplemental content options are associated with the portions of the electronic book relating to the video content. Selection of a respective supplemental content option may render the associated supplemental content item or items, such as one or more of the annotations, the video content, and so on.

The memory 304 includes an electronic book delivery module 316 that is executable by the processor 302 to provide electronic books to the individual 130. In an illustrative example, after the electronic book assembly module 314 has assigned supplemental content items to one or more of the supplemental content portions of the electronic book 106, the electronic book delivery module 316 may send the core content 110 and the supplemental content items to the client device 128. The electronic book delivery module 316 may send the electronic book 106 and the corresponding supplemental content items to the client device 128 in response to a request from the client device 128 for the electronic book 106.

The electronic book delivery module 316 may also send supplemental content metadata indicating the supplemental content items assigned to each corresponding supplemental content portion to the client device 128. In this way, the metadata of the supplemental content items may be utilized to retrieve the respective supplemental content items upon selection by the user 130 and/or upon consuming a particular portion of the electronic book 106. The supplemental content metadata may also specify supplemental content options that are associated with particular portions of the electronic book 106 and the supplemental content items that correspond to the respective supplemental content options.

Further, the memory 304 stores a supplemental content update module 318 that is executable by the processor 302 to send updated supplemental content items to the client device 128 that are associated with electronic books provided to the individual 130. In a particular implementation, contributors of supplemental content items may update their supplemental content items and the supplemental content update module 318 may provide the updated supplemental content items to the client device 128. In another implementation, the supplemental content items associated with certain portions of an electronic book that has been provided to the individual 130 may change over time. For example, as information associated with the individual 130 changes, such as different preferences, different profile information, different usage data, etc., different supplemental content items may be assigned to certain supplemental content portions of the electronic book or may be associated with particular supplemental content options. Consequently, the supplemental content update module 318 may provide replacement or different supplemental content items corresponding to appropriate supplemental content portions and/or supplemental content options of the electronic books provided to the individual 130.

Additional supplemental content items may also become available over time for the electronic books provided to the individual 130. In these cases, the supplemental content update module 318 may identify new supplemental content items that correspond to electronic books provided to the individual 130, determine if the new supplemental content items would be of interest to the individual 130 based on the reputations of the respective contributors of the new supplemental content items, and provide the relevant new supplemental content items to the client device 128.

The memory 304 stores a content usage module 320 that is executable by the processor 302 to track usage of supplemental content items. In some cases, the content usage module 320 may track supplemental content items provided to client devices, such as the client device 128. The content usage module 320 may also record accesses to supplemental content items that have been provided to the client devices. The data collected by the content usage module 320 with respect to supplemental content items may be stored as, at least part of, the supplemental content usage data 306.

Further, the memory 304 stores a revenue sharing module 322 that is executable by the processor 302 to determine compensation to distribute to contributors of supplemental content items. For example, the revenue sharing module 322 may access the supplemental content usage data 306 to determine a number of times a particular supplemental content item has been provided to client devices, a number of accesses of the particular content item, and so on. The revenue sharing module 322 may then determine a compensation to provide to the contributor of the particular supplemental content item based on the number of times a particular supplemental content item has been provided to client devices and/or the number of accesses of the particular content item. Further, the compensation may depend on an amount of a supplemental content item consumed. For example, when a particular supplemental content item includes text, then a value of the compensation provided to a respective contributor of the particular supplemental content item may be based, at least in part, on a number of words of the text read by an individual.

In some cases, the compensation provided to the contributors of the supplemental content items depends on a level of expertise of a respective contributor or a reputation of the contributor with respect to a particular user. Additionally, in some instances, the compensation provided to the contributors of the supplemental content items may depend on feedback received from individuals. For example, the feedback received from the individuals may include ratings provided by the individuals, a number of highlights made by the individuals, a number of comments made or annotations provided by the individuals, other implicit or explicit indicators of quality of the supplemental content items, and so on. The compensation provided to the contributors of the supplemental content items may also be a portion of a payment received by the content provider 102 for an electronic book that includes the supplemental content items.

Client Device Architecture

Figure 4:
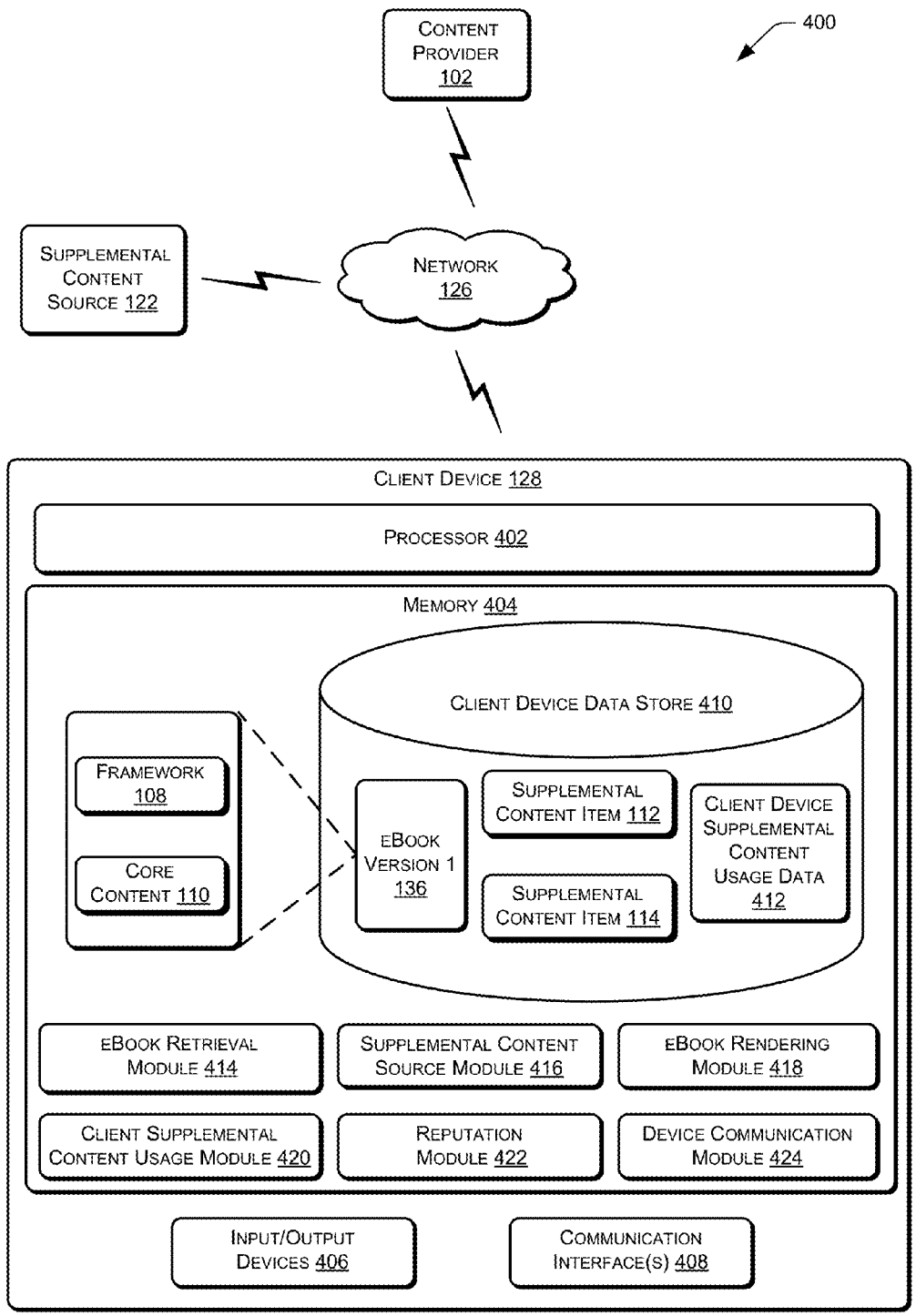
FIG. 4 shows components of the client device from the architecture of FIG. 1.

FIG. 4 shows a system 400 that may include components of the client device 128 from the architecture of FIG. 1. The client device 128 includes one or more processors indicated by processor 402. In addition, the client device 128 includes memory 404. The memory 404 is an example of computer readable storage media and may include volatile memory, nonvolatile memory, removable memory, non-removable memory, or a combination thereof. Thus, the memory 404 may include, but is not limited to, RAM, ROM, EEPROM, flash memory, one or more hard disks, optical memory, or other non-transient memory technologies. The memory 404 includes a number of modules including computer-readable instructions executable by the processor 402 to obtain and/or render versions of electronic books having supplemental content items tailored for users of the client device 128.

The client device 128 also includes input/output devices 406 that may include a touch screen, a keyboard, speakers, a microphone, a display device, or a combination thereof. The client device 128 also includes one or more communication interfaces 408 to facilitate wired and/or wireless communications via the network 126 with the content provider 102, one or more additional client devices (not shown), the supplemental content source 122, or a combination thereof.

The memory 404 includes a client device data store 410. The client device data store 410 may store a version of an electronic book, such as the first version of the electronic book 136. The first version of the electronic book 136 includes a framework 108 and core content 110. The framework 108 may provide a structure for the first version of the electronic book 136 that includes core content portions and supplemental content portions. When the first version of the electronic book 136 is rendered by the client device 128, the core content portions are rendered with certain parts of the core content 110 and the supplemental content portions are rendered with supplemental content items. In some cases, the framework 108 may provide a very specific structure that specifies particular content to include in each core content portion and each supplemental content portion. In other cases, the framework 108 may provide general guidelines to be followed when populating the core content portions and the supplemental content portions.

The client device data store 410 also stores a number of supplemental content items 112-114 to provide in association with the first version of the electronic book 136. The supplemental content items 112-114 may include video content, text content, image content, audio content, or a combination thereof.

The client device data store 404 also stores client device supplemental content usage data 412. The client device supplemental content usage data 412 may include information relating to consumption of supplemental content items via the client device 128. For example, the client device supplemental content usage data 412 may indicate contributors of the supplemental content items consumed via the client device 128, a number of times that particular supplemental content items have been consumed, indicators of progress of a user of the client device 128 with respect to electronic books consumed via the client device 128, or combinations thereof. The client device supplemental content usage data 412 may, upon request or periodically, be provided to the content provider 102 to be used to determine compensation to provide to contributors of supplemental content items.

The memory 404 stores an electronic book retrieval module 414 that is executable by the processor 402 to retrieve electronic books, such as the first version of the electronic book 136, from the content provider 102. In some scenarios, the electronic book retrieval module 414 may send a request to the content provider 102 for a particular electronic book. In other instances, the content provider 102 may provide the particular electronic book to the client device 128 on a periodic basis. For example, the particular electronic book may be received as part of a subscription to a magazine or journal or as part of a book club membership.

In an illustrative implementation, the electronic book retrieval module 414 may receive core content, such as the core content 110, from the content provider 102, in addition, to supplemental content items assigned to supplemental content portions of the first version of the electronic book 136. Further, the electronic book retrieval module 414 may receive supplemental content options associated with certain supplemental content items, where the supplemental content options are selectable to render their respective supplemental content items, provide information relating to their respective supplemental content items, or both. The electronic book retrieval module 414 may also receive metadata from the content provider 102 indicating one or more supplemental content items assigned to each of the supplemental content portions, indicating supplemental content items associated with the supplemental content options, or a combination thereof.

The memory 404 also stores a supplemental content source module 416 that is executable by the processor 402 to retrieve supplemental content items from supplemental content sources, such as the supplemental content source 122. In particular, the supplemental content source module 416 may send a request to the supplemental content source 122 for one or more supplemental content items related to subject matter of an electronic book, such as the first version of the electronic book 136. In some cases, the one or more content items requested may correspond to certain supplemental content portions of the first version of the electronic book 136. The supplemental content source module 416 may also receive supplemental content items from the supplemental content source 122 regularly. In some scenarios, the supplemental content items provided by the supplemental content source 122 may be updates to supplemental content items already stored in the client device data store 410. Further, metadata associated with certain supplemental content portions of the first version of the electronic book 136 indicating supplemental content items associated with the respective supplemental content portions or respective supplemental content options may be utilized by the supplemental content source module 416 to retrieve the supplemental content items from the supplemental content source 122.

In addition, the memory 404 stores an electronic book rendering module 418. The electronic book rendering module 418 may cause content of an electronic book, such as the first version of the electronic book 136, to be provided via one or more output devices 406, such as a display and/or speakers of the client device 128. In particular, the electronic book rendering module 418 may receive a request to view a section of the first version of the electronic book 136. For example, a user of the client device 128 may utilize the input/output devices 406 to select a particular page, chapter, article, or other section of the first version of the electronic book 136 for viewing. The section of the first version of the electronic book 136 selected to be viewed may include a portion of the core content, one or more supplemental content portions, one or more supplemental content options, or a combination thereof.

The electronic book rendering module 418 may cause the core content of the selected section of the first version of the electronic book 136 to be displayed in response to the request to view the section. Further, the electronic book rendering module 418 may cause supplemental content items of the selection section to be displayed. In particular, the electronic book rendering module 418 may identify a supplemental content item that is assigned to a supplemental content portion of the selected section of the first version of the electronic book 136 and provide the supplemental content item via the one or more output devices 406.

In some situations, the supplemental content items may be provided in response to selection of a particular supplemental content option by a user of the client device 128. For example, the electronic book rendering module 418 may determine that a particular portion of the first version of the electronic book 136 is associated with a supplemental content option that is selectable to display information regarding one or more supplemental content items associated with the supplemental content option, to consume the one or more supplemental content items associated with the supplemental content option, or both. The supplemental content option may be rendered in association with a specific portion of text of the first version of the electronic book 136. In some cases, the supplemental content option may be associated with a particular supplemental content item that corresponds to a supplemental content portion, such as an annotation relating to an illustration provided with the first version of the electronic book 136. In these cases, the supplemental content option may be rendered in association with the particular supplemental content item. In any case, upon selection of the supplemental content option, the electronic book rendering module 418 may cause a pop-up window or other suitable display to be rendered that includes options, such as links, that are selectable to consume supplemental content items, such as video content, image content, annotations, and the like, related to the particular portion of the first version of the electronic book 136 and/or the particular supplemental content item.

Further, the memory 404 stores a client supplemental content usage module 420 that is executable by the processor 402 to track supplemental content items provided to the client device 128, to track accesses to supplemental content items stored in the client device data store 410, and/or to track consumption of supplemental content items via the client device 128. The client supplemental content usage module 420 may store the data indicating usage of supplemental content items as the client device supplemental content usage data 412. The client supplemental content usage module 420 may also send the data indicating usage of supplemental content items via the client device 128 to the content provider 102 or to another entity.

The memory 404 also stores a reputation module 422 that is executable by the processor 402 to determine a reputation of a contributor of supplemental content items with respect to a user of the client device 128. In an illustrative implementation, the reputation module 422 may evaluate information of the contributor with respect to information of a user of the client device 128. For example, the reputation module 422 may determine a reputation of the contributor with respect to the user of the client device 128 based on user profile data, user preferences, whether the contributor is an expert in a field related to the first version of the electronic book 136, whether supplemental content items of the contributor have been ranked highly by members of a social network of the user, and so on. The closer that characteristics of a particular contributor match the preferences or other data of a user of the client device 128 and/or the greater the degree of familiarity of the particular contributor with the user of the client device 128, the higher the reputation of the particular contributor with respect to the user of the client device 128.

The reputation of contributors of supplemental content items may be utilized to identify supplemental content items to provide in association with particular portions of the first version of the electronic book 128. For example, the electronic book rendering module 418 may select a particular supplemental content item from a group of supplemental content items to render in association with a particular portion of the first version of the electronic book 136 based on the reputation of the contributor of the particular supplemental content item with respect to a user of the client device 128. In another example, the electronic book retrieval module 414 and/or the supplemental content source module 416 may utilize the reputation of contributors of supplemental content items with respect to a user of the client device 128 to determine supplemental content items to retrieve from the content provider 102 and/or the supplemental content source 122.

The memory 404 includes a device communication module 424 that is executable by the processor 402 to communicate information relating to content of electronic books to additional computing devices. For example, the device communication module 424 may transmit commands to configure other devices according to the information of the electronic books. To illustrate, the device communication module 424 may send commands to a portable GPS device to provide routes to certain destinations of a travel book rendered via the client device 128. In other illustrative examples, the device communication module 424 may transmit commands related to settings of the additional computing devices, such as settings of a portable media player, a household appliance, a vehicle, etc., based on the content of a particular electronic book, such as an oven setting for a recipe in a cook book.

Illustrative Electronic Book Pages Associated with Supplemental Content Items

Figure 5:
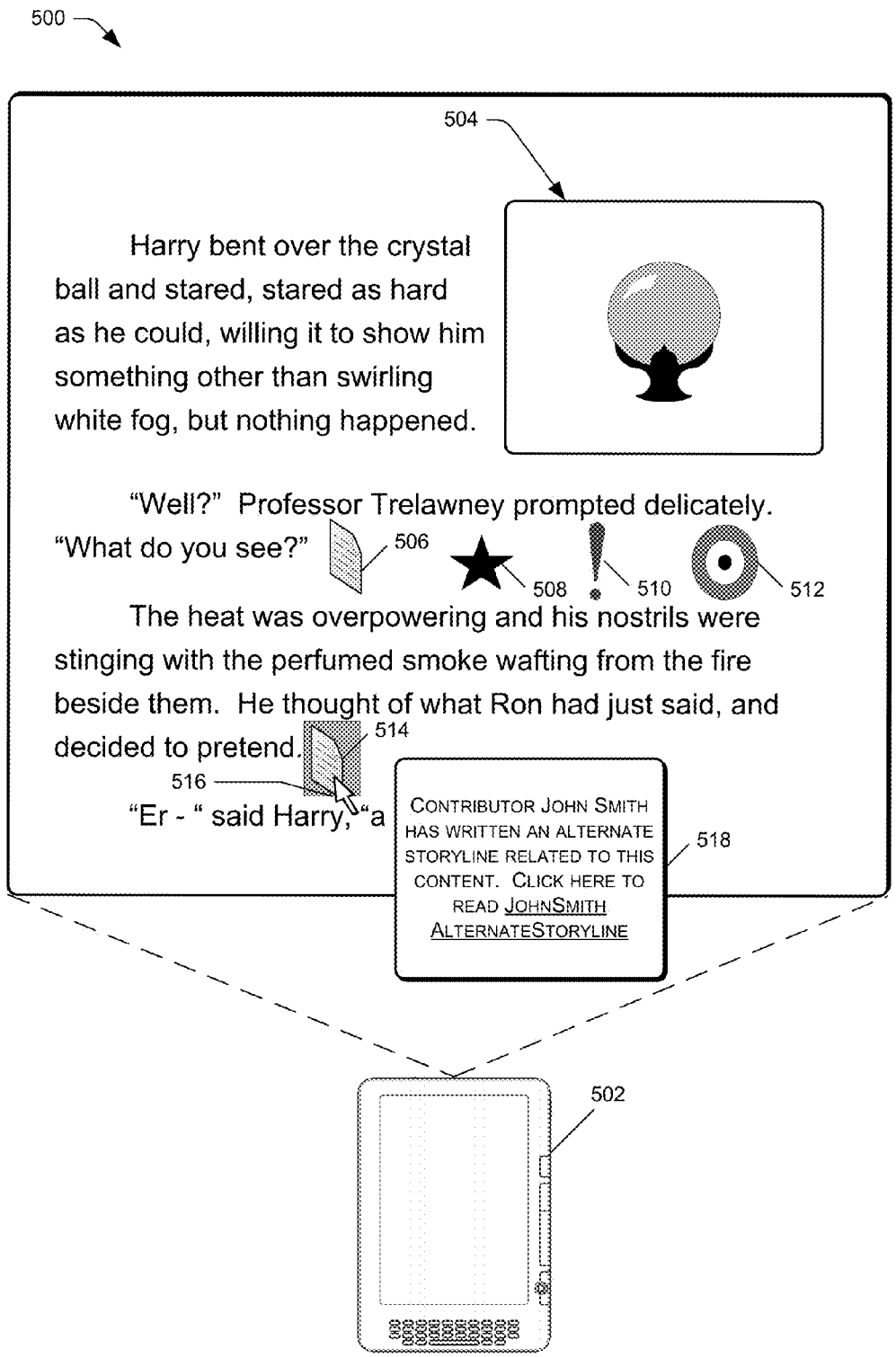
FIG. 5 shows a first example of a page of an electronic book having supplemental content portions that include supplemental content items that are tailored to the preferences of individuals.

FIG. 5 shows a first example of a page 500 of an electronic book having supplemental content portions that include supplemental content items that are tailored to the preferences of users of a client device 502. The page 500 includes supplemental content item 504 that includes image content related to the text content of the page 500. The supplemental content item 504 may be selectable. In an illustrative implementation, an input device, such as a mouse, stylus, or finger may be utilized to select the supplemental content item 504 and, in response, a pop-up menu may appear that provides options relating to the supplemental content item 504. The options relating to the supplemental content item may include replacing the supplemental content item 504 with another image or a different type of supplemental content, such as video content and/or text content. Further, the options relating to the supplemental content item 504 may include turning off viewing of the supplemental content item 504.

The page 500 also includes a number of supplemental content options 506-514. Each of the supplemental content options 506-514 may be selectable to access respective supplemental content items. Additionally, the form of the supplemental content options 506-514 may indicate a type of supplemental content item associated with the particular supplemental content option 506-514.

In an illustrative implementation, the supplemental content option 506 may be selectable to view text content related to the particular portions of the text content proximate to the supplemental content option 506. For example, the supplemental content option 506 may be selectable to view annotations relating to the text content, alternative storylines running parallel to the text content, the text content written in a different style, the text content written in a different mood, a description from the point of view of another character, fan fiction related to the text content, replacement text for the text content, reference materials, information relating to the characters of the text content, or a combination thereof.

Further, the supplemental content option 508 may be selectable to access other types of supplemental content items, such as video or audio supplemental content items related to the text content proximate to the supplemental content option 508. In addition, the supplemental content option 510 may be selectable to view recommendations and/or alerts associated with the text content. For example, the supplemental content option 510 may be selectable to view a recommendation from a member of a social network of the user or a recommendation from the content provider to skip ahead to another portion of the electronic book based on past reading history of the user or of members of a social network of the user. In addition, the supplemental content option 512 may be selectable to view advertisements related to the text content. In one example, the supplemental content option 512 is selectable to view information relating to a theme park relating to the text content. In some instances, rather than displaying the supplemental content options 506-512 inline with the text content, an additional display portion may be provided proximate to the page 500 that shows the supplemental content options 506-512 or that otherwise indicates that supplemental content items are available that are related to the text content of the page 500.

In an illustrative implementation, FIG. 5 shows selection of a supplemental content option 514 via a cursor 516. In some cases, selection of the supplemental content option 514 may include activating a pointing device when the cursor 516 is proximate to the supplemental content option 514. In other cases, the supplemental content option 514 may be selected by hovering the cursor 516 over the supplemental content option 514 using the pointing device. Selection of the supplemental content option 514 results in display of a pop-up window 518. The pop-up window 518 indicates that an alternate storyline is available for viewing by the contributor, John Smith, upon selection of a link provided in the pop-up window 518. The supplemental content item provided upon selection of the link in the pop-up window 518 may depend on a reputation of the contributor of the supplement content item with respect to a user of the client device 502. In some scenarios, the supplemental content item provided may have been selected from a number of possible supplemental content items based on the reputation of the contributor with respect to the user of the client device 502. Additionally, although one link to a supplemental content item is shown in the pop-up window 518, multiple links to supplemental content items may be provided in the pop-up window 518.

Figure 6:
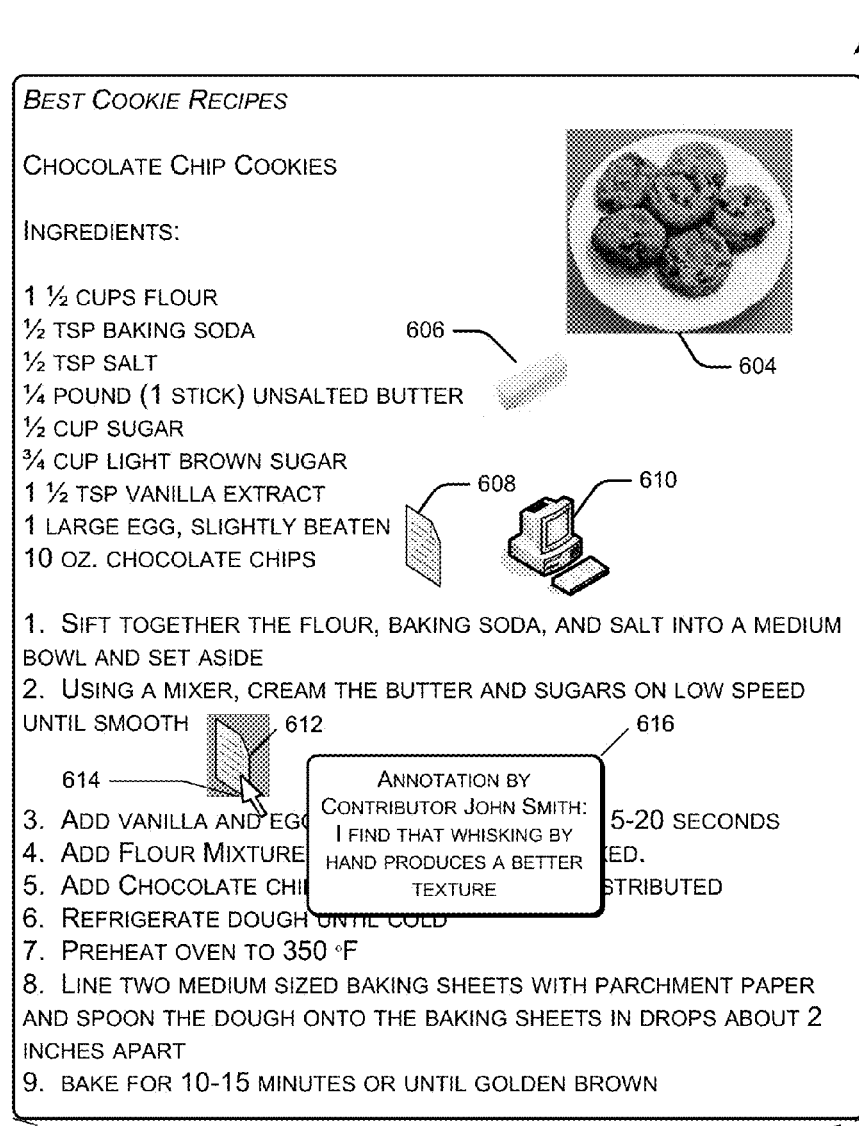
FIG. 6 shows a second example of a page of an electronic book having supplemental content portions that include supplemental content items that are tailored to the preferences of individuals.
Figure 6:
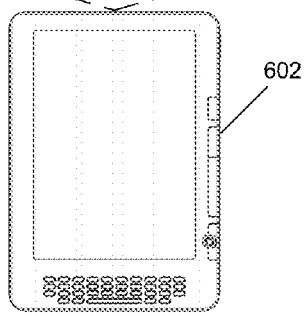

FIG. 6 shows a second example of a page 600 of an electronic book having supplemental content portions that include supplemental content items that are tailored to the preferences of users of a client device 602. The page 600 includes supplemental content items 604 and 606 that include image content related to the text content of the page 600. The supplemental content items 604 and 606 may be selectable. In an illustrative implementation, an input device, such as a mouse, stylus, or finger may be utilized to select the supplemental content items 604 and 606. In response to selection of the supplemental content items 604 and 606, a pop-up menu may appear that provides options relating to the supplemental content items 604 and 606. The options relating to the supplemental content item 604 and 606 may include replacing the supplemental content item 604 or 606 with another image or a different type of supplemental content, such as video content and/or text content. Further, the options relating to the supplemental content items 604 and 606 may include turning off viewing of the supplemental content items 604 and 606.

The page 600 also includes a number of supplemental content options 608-612. Each of the supplemental content options 608-612 may be selectable to access respective supplemental content items. Additionally, the form of the supplemental content options 608-612 may indicate a type of supplemental content option.

In an illustrative implementation, the supplemental content options 608 and 612 may be selectable to view text content related to the particular portions of the text content proximate to the respective supplemental content options 608 and 612. In some cases, the supplemental content options 608 and 612 are selectable to view annotations relating to the text content, replacement text for the text content, reference materials, or a combination thereof. In a particular example, selection of the supplemental content option 608 may provide access to alternative ingredients for the recipe shown in the page 600. In another example shown in FIG. 6, the supplemental content option 612 is selected via a cursor 614 to display a pop-up window 616 that includes an annotation by contributor John Smith relating to step 2 of the recipe. In some cases, the supplemental content item provided upon selection of the supplemental content option 612 may depend on a reputation of the contributor of the supplemental content item with respect to a user of the client device 602. To illustrate, the contributor John Smith of the supplemental content item shown in the pop-up window 616 may be an expert chef and/or a member of a social network of a user of the client device 602.

Further, the supplemental content option 610 may be selectable to send commands to another device associated with a user of the client device 602. For example, upon selection of the supplemental content option 610, a grocery list including the ingredients of the recipe on page 600 may be sent to a grocery ordering service. In another example, selection of the supplemental content option 610 may cause commands to be sent to an oven to begin pre-heating the oven in accordance with the recipe or commands may be sent to a printer to print the list of ingredients of the recipe.

Illustrative Processes

FIGS. 7-10 show processes 700-1000 respectively, to provide electronic books with customized supplemental content. The processes 700-1000 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 7:
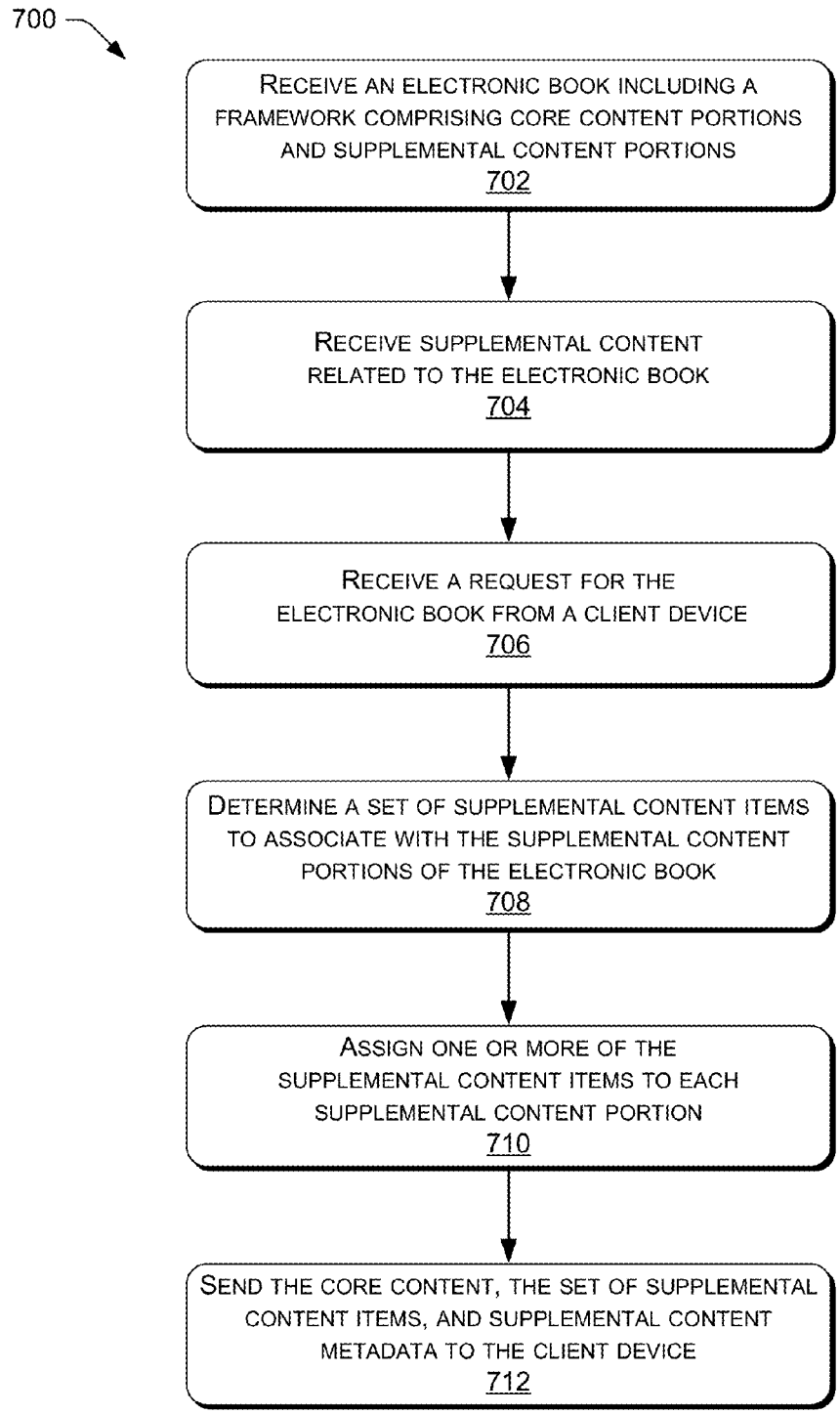
FIG. 7 is a flow diagram of a process to provide an electronic book and supplemental content items to a client device according to a framework of the electronic book.

FIG. 7 is a flow diagram of a process 700 to provide an electronic book and supplemental content items to a client device according to a framework of the electronic book. At 702, a content provider receives an electronic book including a framework. The framework includes core content portions and supplemental content portions. The supplemental content portions may indicate a portion of an electronic book that may be rendered with a respective supplemental content item. In some cases, the framework may specify types of content that are to be rendered in association with certain sections of the electronic book. For example, the framework may indicate places where audio and video content can be rendered. The framework may also indicate locations for particular types of text content, such as text content related to certain subject matter, text content written with a specified style, text content written in a particular mood, and so on.

At 704, the content provider receives supplemental content related to the electronic book. For example, the content provider may receive supplemental content items related to the electronic book from contributors and/or the content provider may search for and retrieve supplemental content items relating to the electronic book. In some cases, the supplemental content items may include image content relating to the electronic book, such as photos or illustrations of locations, items, characters, scenes, etc. of the electronic book. The supplemental content items may also include text content, such as annotations, alternative text, additional story lines, reference materials, text content written in a different style, text content written in a different genre, translations of text content, and so on. Further, the supplemental content items may include video content relating to the electronic book, such as video of locations, scenes, and the like of the electronic book.

At 706, the content provider receives a request for the electronic book from a client device. At 708, the content provider determines a set of supplemental content items to associate with the supplemental content portions of the electronic book. In particular, the content provider may identify a group of the supplemental content items that include content relating to the electronic book.

At 710, the content provider assigns one or more of the supplemental content items of the set to each supplemental content portion. In an illustrative implementation, the content provider may select supplemental content items from contributors based on a reputation of the contributors with respect to the user of the client device. In some scenarios, the reputation of the contributor with respect to the user may be determined by evaluating information of the contributor with respect to information of the user. For example, the reputation of the contributor with respect to the user may be based on whether the contributor is a member of a social network of the user, whether the contributor is considered an expert in fields relating to the electronic book, ratings of the contributor, similarities in interests and/or profile information of the user and the contributor, preferences of the user, or combinations thereof. Additionally, the supplemental content items assigned to the supplemental content portions may be based on whether the respective contributors of the supplemental content items have reputations with respect to the user of the client device that are above a threshold. The threshold may correspond to a degree of familiarity between the contributors of the supplemental content items and the user of the client device and/or a degree of matching between certain preferences of the user and information of the contributors (e.g. whether a particular contributor is an expert in a field). Certain supplemental content items may also be assigned to respective supplemental content portions when the reputations of the respective contributors with respect to the user of the client device are higher than the reputations of other contributors of supplemental content items with respect to the client device user.

At 712, the content provider sends the core content of the electronic book and the supplemental content items assigned to the supplemental content portions to the client device. Additionally, the content provider sends supplemental content metadata to the client device. The supplemental content metadata indicates the one or more supplemental content items that are assigned to each respective supplemental content portion.

Figure 8:
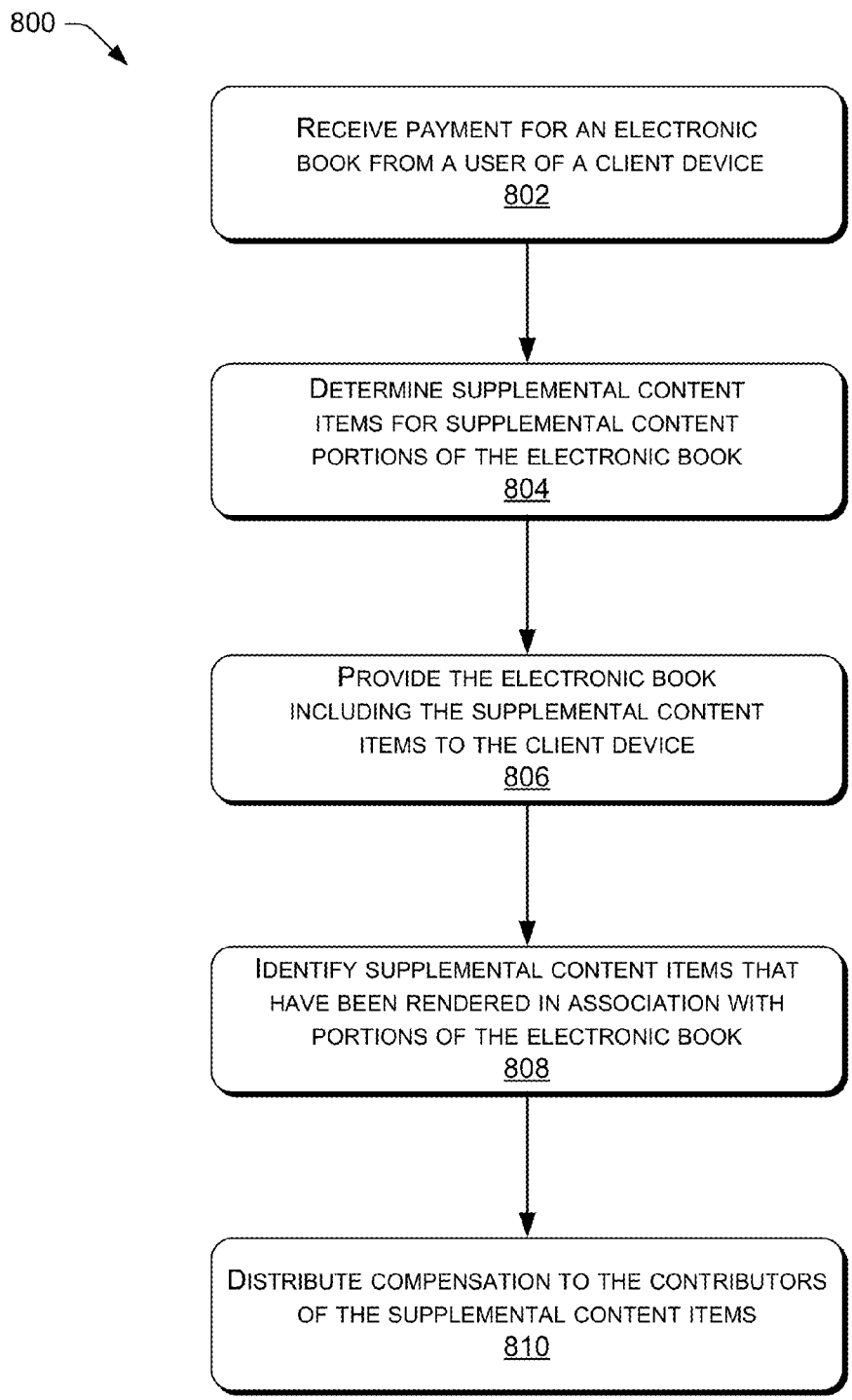
FIG. 8 is a flow diagram of a process to distribute revenue to contributors of supplemental content items for electronic books.

FIG. 8 is a flow diagram of a process 800 to provide revenue to contributors of supplemental content items for electronic books. At 802, a content provider receives payment for an electronic book from a user of the client device. The payment may be in the form of a one-time fee or a full or partial payment of a subscription fee.

At 804, the content provider determines supplemental content items to include with the electronic book. In particular, the content provider determines supplemental content items to assign to respective supplemental content portions of the electronic book. At 806, the electronic book including the supplemental content items is provided to the client device. At 808, the content provider identifies supplemental content items that have been rendered in association with portions of the electronic book. For example, the content provider may identify supplemental content items that have been automatically rendered in the electronic book, such as image content that is rendered in association with certain text or certain articles that are included in a magazine. In another example, the content provider may identify supplemental content items that have been consumed by a user of the client device via selection of a supplemental content option.

At 810, the content provider distributes compensation to the contributors of the supplemental content items that have been rendered. For example, the content provider may provide a certain percentage of the payment received for the electronic book to the respective contributors of the rendered supplemental content items.

Figure 9:
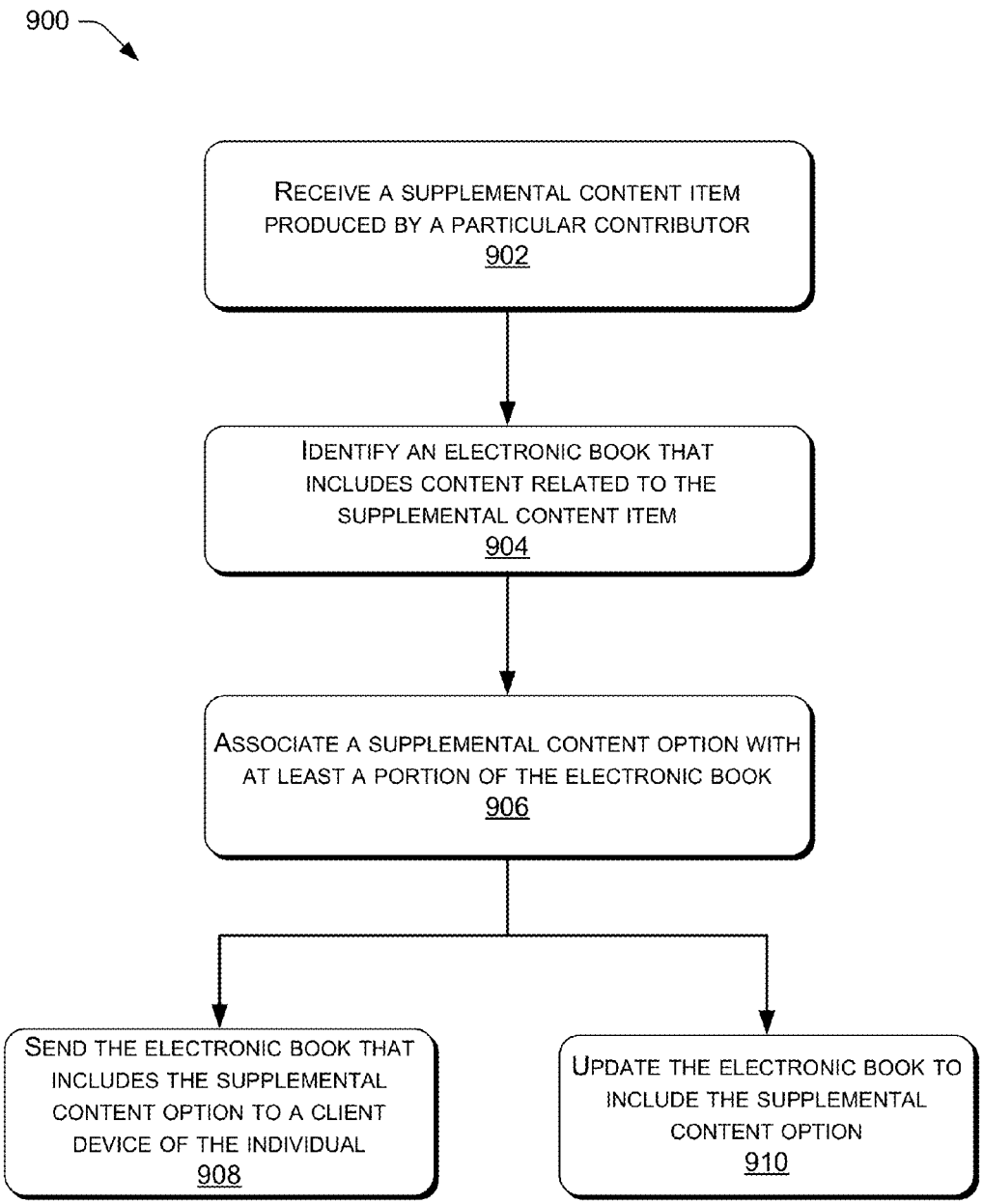
FIG. 9 is a flow diagram of a process to associate a supplemental content option with a particular portion of an electronic book, where the supplemental content option is selectable to view one or more supplemental content items related to the particular portion of the electronic book.

FIG. 9 is a flow diagram of a process 900 to associate a supplemental content option with a particular portion of an electronic book, where the supplemental content option is selectable to view one or more supplemental content items related to the particular portion of the electronic book. At 902, a content provider receives a supplemental content item produced by a particular contributor. The supplemental content item may include text content, such as an article, an annotation, at least some portions of an electronic book written from a particular style, theme, or mood, alternative storylines, reference information, and the like. The supplemental content item may also include video content, image content, audio content, or combinations thereof.

At 904, the content provider identifies an electronic book that includes content related to the supplemental content item. In some cases, the supplemental content item may include metadata indicating an electronic book that includes content related to the supplemental content item. In other cases, the content provider compares content of the supplemental content item with content of electronic books to find matches between the supplemental content item and one or more electronic books. In one example, the content provider may determine that the supplemental content item is an annotation corresponding to a particular portion of the electronic book. In another example, the content provider may determine that the supplemental content item is an illustration relating to a particular portion of the electronic book.

At 906, the content provider associates a supplemental content option with at least a portion of the electronic book. For example, the content provider may associate the supplemental content option with a particular paragraph, page, chapter, article, or other section of the electronic book based on a relationship between the content of the supplemental content item and the content of the electronic book. In some cases, the supplemental content item may not be associated with a particular portion of the electronic book. To illustrate, the supplemental content item may be text content of the electronic book written from a different perspective, text content of the electronic book written in a different style, a work of fan fiction related to the electronic book, and so on. In these cases, the supplemental content option may be associated with a title page or with a supplemental content items page that lists the supplemental content items of the electronic book.

The supplemental content option may be selectable to consume the supplemental content item. For example, upon selection of the supplemental content option, video content or image content of the supplemental content item may be rendered. In another example, text content of an annotation, of an additional storyline, of reference materials, etc. may be rendered upon selection of the supplemental content option. Additionally, and/or alternatively, selection of a supplemental content option may provide information relating to the supplemental content item, a link selectable to render the supplemental content item, or both.

Depending on whether the electronic book has already been delivered to an individual, the process may proceed to 908 or 910. In particular, when the electronic book has not yet been delivered to a particular individual, the method moves to 908 where the electronic book, as well as the supplemental content option, are sent to an individual requesting the electronic book. Supplemental content items accessible via respective supplemental content options may be based on a reputation of the particular contributor of the supplemental content item with respect to the individual.

When the electronic book has already been provided to a particular individual, the electronic book may be updated to include the supplemental content option. For example, information may be sent to a client device of the individual specifying that the supplemental content option should be added to the electronic book. In some cases, the supplemental content item may also be sent to the client device. In this way, as new supplemental content items are produced that relate to the electronic book, individuals that have already received the electronic book can have access to the new supplemental content items.

Figure 10:
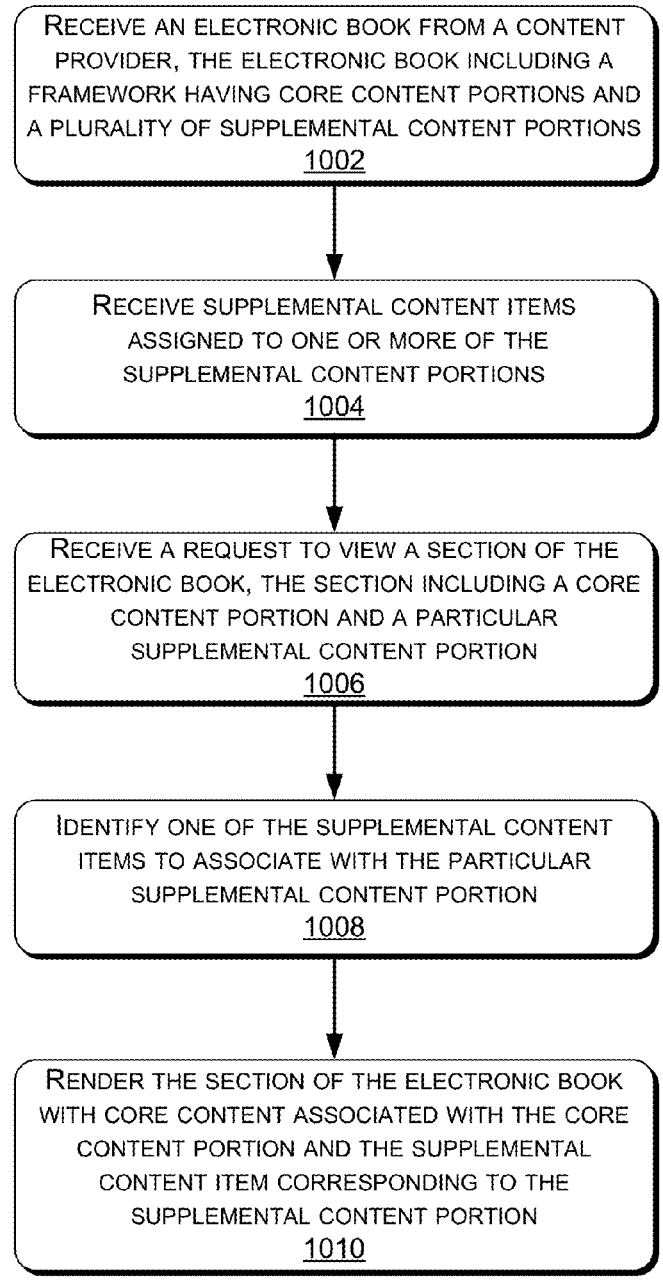
FIG. 10 is a flow diagram of a process to render an electronic book with supplemental content that is tailored to the preferences of an individual.

FIG. 10 is a flow diagram of a process 1000 to render an electronic book with supplemental content that is tailored to the preferences of a user of a client device. At 1002, the client device receives an electronic book from a content provider. The electronic book includes a framework with core content portions and a plurality of supplemental content portions. The supplemental content portions may indicate portions of the electronic book that may be rendered in association with supplemental content items.

At 1004, the client device receives supplemental content items assigned to one or more of the supplemental content portions of the electronic book. At 1006, the client device receives a request to view a section of the electronic book. For example, a user of the client device may activate one or more input devices to view an article of the electronic book, a page of the electronic book, or some other section of the electronic book. The section of the electronic book may include a core content portion and a particular supplemental content portion.

At 1008, the client device identifies one of the supplemental content items to associate with the particular supplemental content portion. In one implementation, the client device may access metadata associated with the electronic book and identify the supplemental content item that is assigned to the particular supplemental content portion. At 1010, the client device renders the section of the electronic book with the core content associated with the core content portion and with the supplemental content item corresponding to the supplemental content portion.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computing systems configured with specific executable instructions,
   receiving a request for an electronic book from a client device, the electronic book including a plurality of supplemental content portions;
   identifying a supplemental content item to associate with a particular supplemental content portion, the supplemental content item produced by a contributor;
   evaluating information of the contributor in relation to information of a user of the client device to determine a reputation of the contributor with respect to the user;
   assigning the supplemental content item to the particular supplemental content portion based on the reputation of the contributor with respect to the user; and
   sending the electronic book with the supplemental content item to the client device.

2. The computer-implemented method of claim 1, wherein the reputation of the contributor with respect to the user depends, at least in part, on whether the contributor is considered an expert in one or more subjects related to the electronic book.

3. The computer-implemented method of claim 1, wherein the reputation of the contributor with respect to the user depends, at least in part, on whether the contributor is included in a social network of the user.

4. The computer-implemented method of claim 1, wherein the information of the contributor and the information of the user include one or more of the following: profile information of the user, interests of the user, preferences of the user, social network information of the user, profile information of the contributor, interests of the contributor, preferences of the contributor, social network information of the contributor, ratings of one or more supplemental content items produced by the contributor, previous consumption of supplemental content items of the contributor by the user, previous consumption of supplemental content items of the contributor by members of a social network of the user, or recommendations of the supplemental content item.

5. The computer-implemented method of claim 1, wherein the supplemental content item is assigned to the particular supplemental content portion when the reputation of the contributor with respect to the user is greater than a threshold.

6. The computer-implemented method of claim 1, wherein the supplemental content item is assigned to the particular supplemental content portion when the reputation of the contributor with respect to the user is greater than a reputation of an additional contributor of a different supplemental content item with respect to the user.

7. The computer-implemented method of claim 1, wherein the supplemental content item is one of a plurality of supplemental content items assigned to the particular supplemental content portion.

8. The computer-implemented method of claim 1, further comprising:
  receiving a request for the electronic book from an additional client device;
  evaluating the information of the contributor in relation to information of an additional user of the additional client device to determine a reputation of the contributor with respect to the additional user;
  assigning a different supplemental content item to the particular supplemental content portion according to the reputation of the contributor with respect to the additional user; and
  sending the electronic book with the different supplemental content item to the additional client device.

9. The computer-implemented method of claim 1, further comprising:
  receiving an indication that the contributor has updated the supplemental content item;
  updating the supplemental content item based at least in part on the indication; and
  sending, to the client device, the updated supplemental content item, the updated supplemental content item replacing the supplemental content item and being perceivable by the user of the client device.

10. The computer-implemented method of claim 1, wherein a type of the supplemental content item that is assigned to the particular supplemental content portion is based at least in part on a framework of the electronic book.

11. The computer-implemented method of claim 1, further comprising:
  determining a plurality of supplemental content items that are to be assigned to the plurality of supplemental content portions; and
  assigning a number of the supplemental content items based at least in part on a framework of the electronic book.

12. A system comprising:
  one or more processors;
  memory;
  an electronic book retrieval module stored in the memory and executable by the one or more processors to receive a request for an electronic book from a client device, the electronic book including a plurality of supplemental content portions;
  a supplemental content source module stored in the memory and executable by the one or more processors to identify a supplemental content item to associate with a particular supplemental content portion, the supplemental content item produced by a contributor;
  a reputation module stored in the memory and executable by the one or more processors to evaluate information of the contributor in relation to information of a user of the client device to determine a reputation of the contributor with respect to the user;
  an electronic book assembly module stored in the memory and executable by the one or more processors to assign the supplemental content item to the particular supplemental content portion based on the reputation of the contributor with respect to the user; and
  an electronic book delivery module stored in the memory and executable by the one or more processors to send the electronic book with the supplemental content item to the client device.

13. The system of claim 12, wherein the supplemental content item includes at least one of video content, text content, image content, audio content, or a combination thereof.

14. The system of claim 12, wherein the electronic book delivery module is further executable by the one or more processors to send supplemental content item metadata to the client device, the supplemental content item metadata specifying that the supplemental content item is assigned to the particular supplemental content portion.

15. The system of claim 12, wherein the information of the user includes at least one of interests of the user, preferences of the user, or historical data associated with the user.

16. The system of claim 12, further comprising a client supplemental content usage module stored in the memory and executable by the one or more processors to track supplemental content items provided to the client device or to track consumption of supplemental content items via the client device.

17. The system of claim 12, wherein the supplemental content source module is further executable by the one or more processors to retrieve an additional supplemental content item from a supplemental content source.

18. The system of claim 12, wherein the reputation of the contributor with respect to the user depends, at least in part, on whether the contributor is considered an expert in one or more subjects related to the electronic book.

19. The system of claim 12, wherein the reputation of the contributor with respect to the user depends, at least in part, on whether the contributor is included in a social network of the user.

20. One or more computer-readable media storing computer-executable instructions that, when executed by one or more processors, cause the one or more processors to perform operations comprising:
  receiving a request for an electronic book from a client device, the electronic book including a plurality of supplemental content portions;
  identifying a supplemental content item to associate with a particular supplemental content portion, the supplemental content item produced by a contributor;
  evaluating information of the contributor in relation to interests or preferences of a user of the client device to determine a reputation of the contributor with respect to the user;
  assigning the supplemental content item to the particular supplemental content portion based on the reputation of the contributor with respect to the user; and
  sending the electronic book with the supplemental content item to the client device.

21. The one or more computer-readable media of claim 20, wherein the supplemental content item is assigned to the particular supplemental content portion when the reputation of the contributor with respect to the user is greater than a threshold.

22. The one or more computer-readable media of claim 20, wherein the supplemental content item is assigned to the particular supplemental content portion when the reputation of the contributor with respect to the user is greater than a reputation of an additional contributor of a different supplemental content item with respect to the user.

23. The one or more computer-readable media of claim 20, wherein the operations further comprise:
   receiving a request for the electronic book from an additional client device;
   evaluating the information of the contributor in relation to interests or preferences of an additional user of the additional client device to determine a reputation of the contributor with respect to the additional user;
   assigning a different supplemental content item to the particular supplemental content portion according to the reputation of the contributor with respect to the additional user; and
   sending the electronic book with the different supplemental content item to the additional client device.

24. The one or more computer-readable media of claim 20, wherein the operations further comprise sending, to the client device, updated supplemental content items that are associated with the electronic book, at least one of the updated supplemental content items being an update of the supplemental content item.

25. The one or more computer-readable media of claim 20, wherein a type of the supplemental content item that is assigned to the particular supplemental content portion is based at least in part on a framework of the electronic book.

26. The one or more computer-readable media of claim 20, wherein a number of supplemental content items that are to be assigned to the plurality of supplemental content portions is based at least in part on a framework of the electronic book.

27. The one or more computer-readable media of claim 20, wherein the interests of preferences of the user are determined based at least in part on historical data associated with the user.

\* \* \* \* \*